(12) United States Patent
Yabashi et al.

(10) Patent No.: US 7,495,548 B2
(45) Date of Patent: Feb. 24, 2009

(54) VEHICLE CABIN LIGHTING APPARATUS

(75) Inventors: Hiroyuki Yabashi, Tokyo (JP);
Yasuhiro Miyamoto, Hyogo (JP);
Norimitsu Hasegawa, Hyogo (JP);
Shigeru Ichida, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 173 days.

(21) Appl. No.: 10/573,983

(22) PCT Filed: Jun. 6, 2005

(86) PCT No.: PCT/JP2005/010370

§ 371 (c)(1),
(2), (4) Date: Mar. 30, 2006

(87) PCT Pub. No.: WO2006/013676

PCT Pub. Date: Feb. 9, 2006

(65) Prior Publication Data
US 2006/0279959 A1 Dec. 14, 2006

(30) Foreign Application Priority Data
Aug. 6, 2004 (JP) .............................. 2004-230952

(51) Int. Cl.
*B60Q 1/00* (2006.01)
(52) U.S. Cl. .................. 340/425.5; 340/425.5; 340/458; 340/461; 340/436; 345/6; 345/7
(58) Field of Classification Search .............. 340/425.5, 340/458, 459, 461, 438; 345/6, 7
See application file for complete search history.

(56) References Cited

U.S. PATENT DOCUMENTS

| 6,731,252 | B2 * | 5/2004 | Sugiyama et al. .............. 345/6 |
| 2004/0189947 | A1 * | 9/2004 | Hattori et al. ................. 353/13 |

FOREIGN PATENT DOCUMENTS

| JP | 62-64647 A | 3/1987 |
| JP | 2-118368 U | 9/1990 |
| JP | 6-35801 Y2 | 9/1994 |
| JP | 7-17647 U | 3/1995 |
| JP | 2002-533258 A | 10/2002 |
| JP | 2004-127466 A | 4/2004 |

* cited by examiner

*Primary Examiner*—Daryl C Pope
(74) *Attorney, Agent, or Firm*—Birch, Stewart, Kolasch & Birch, LLP

(57) ABSTRACT

A vehicle cabin lighting apparatus includes a monitor 1 mounted to a ceiling of a vehicle cabin, a monitor folding-or-unfolding detecting means 2 for detecting whether the monitor is placed in a folded or unfolded state, and a monitor control means 3 for determining whether the monitor is placed in a video display mode or lighting mode based on a detection output of the monitor folding-or-unfolding detecting means, for controlling the operation of the monitor according to a result of the determination, and for applying, as illumination light, light emitted out of the monitor to the vehicle cabin when the monitor is placed in the lighting mode.

16 Claims, 11 Drawing Sheets

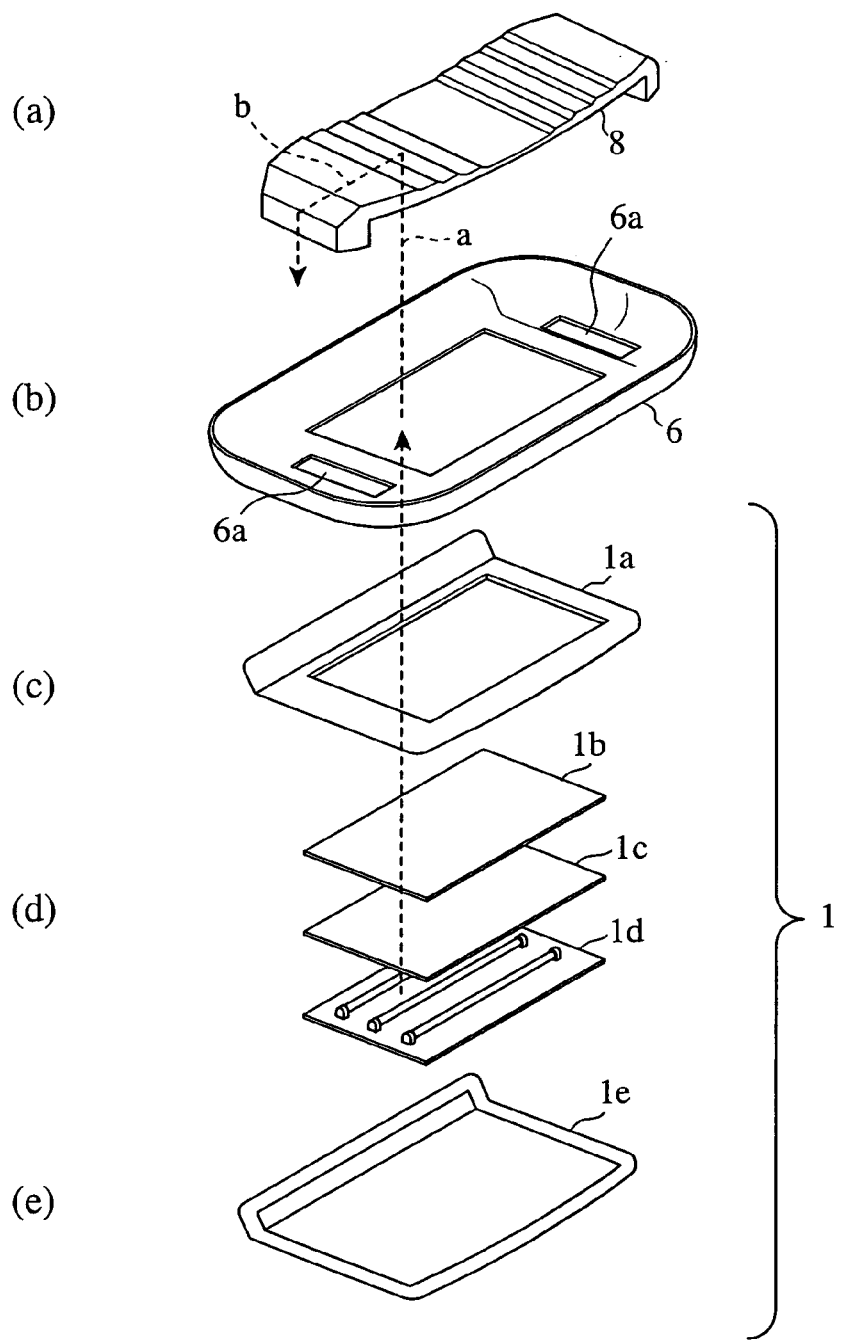

FIG.15

| | | Display Contents | | |
|---|---|---|---|---|
| | | When Monitor Is Folded | | |
| | | Video Display Mode | Lighting Mode | Alarm Mode |
| Alarm | No Alarm | Monitor Is Not Switched On | Monitor Is Switched On | Monitor Is Not Switched On |
| | Immobilizer (Antitheft Device) | Monitor Emits Red Light and Blinks (At Intervals of 0.5 Seconds) Monitor Is Switched Off When Immobilizer Is Released | | |
| | Warning Indicating That Door Is Not Completely Closed | Monitor Emits Yellow Light Monitor Is Switched Off When Door Is Closed | | |
| | Seat Belt Wearing Warning | Monitor Emits Orange Light and Blinks (At Intervals of 1 Second for 10 Seconds -> At Intervals of 0.5 Seconds) Monitor Is Switched Off When Seat Belt Is Worn | | |
| | Remaining Oil Amount Warning | Monitor Emits Green Light and Blinks (At Intervals of 2 Seconds) Monitor Is Switched Off When Alarm Unit Is Released | | |
| | Remaining Fuel Amount Warning | Monitor Emits Blue Light and Blinks (At Intervals of 2 Seconds) Monitor Is Switched Off When Alarm Unit Is Released | | |
| | Remaining Battery Charged Capacity Warning | Monitor Emits White Light and Blinks (At Intervals of 2 Seconds) Monitor Is Switched Off When Alarm Unit Is Released | | |
| | Simultaneous Occurrence of Two or More Alarms | Generate Alarm Displays Corresponding To Alarms One By One (Switch Among Alarm Displays at Intervals of 10 Seconds) Generation of Each Alarm Display Is Switched Off When Corresponding Alarm Is Released | | |

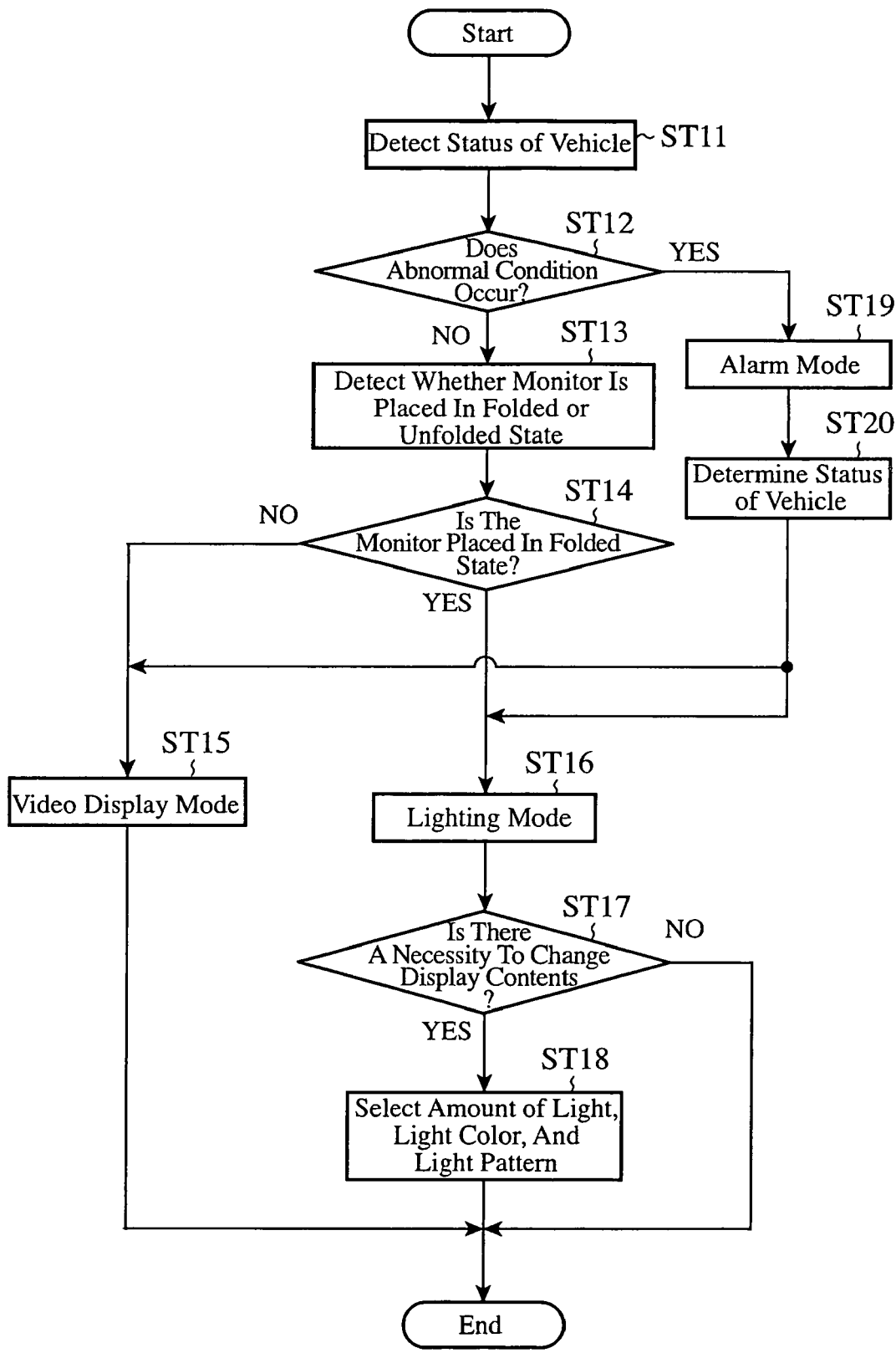

VEHICLE CABIN LIGHTING APPARATUS

FIELD OF THE INVENTION

The present invention relates to a vehicle cabin lighting apparatus, and, more particularly, to a vehicle cabin lighting apparatus which uses, as vehicle cabin lighting, image light emitted out of a ceiling-mounted monitor system (referred to as a monitor system from here on).

BACKGROUND OF THE INVENTION

In general, a vehicle has room light which is disposed nearly on the center of the ceiling thereof in order to illuminate the whole of the cabin of the vehicle, and which is made to be switched on or off according to a passenger's switching operation or opening or closing of a door. Since such a vehicle cabin lighting apparatus aims at lighting the interior of a vehicle cabin at night or the like, the lightness and hue of light emitted out of the vehicle cabin lighting apparatus are fixed and it is not necessary to change them in particular.

There have been proposed, as related art vehicle cabin lighting apparatus, a display for displaying information on the operation of a vehicle which is disposed in the cabin ceiling of the vehicle so that the driver on the driver's seat can visually recognize an image displayed on the display via a reflecting mirror placed in the front of the driver's seat (for example, refer to patent reference 1), and a monitor display apparatus for vehicle-mounted camera which is used for lighting the vicinity of the driver's seat (for example, refer to patent reference 2).

[Patent reference 1] JP, 6-35801, Y

[Patent reference 2] JP, 7-17647, U

A problem with the above-mentioned related art vehicle cabin lighting apparatus is, however, that since they aim at lighting the interior of a vehicle cabin at night or the like, and the lightness and hue of light emitted out of the vehicle cabin lighting apparatus are fixed and it is not necessary to change them in particular, they cannot structurally emit light having an arbitrary amount falling within a variable range and an arbitrary tone, and, even in the case of above-mentioned patent references 1 and 2, since they simply make it possible for the driver to visually recognize an image displayed on a display for displaying information on the operation of the vehicle via a reflecting mirror placed in the front of the driver's seat, or simply use the light emitted out of the display for lighting the vicinity of the driver's seat, they cannot structurally and effectively use the image light from the monitor (e.g., a liquid crystal display) mounted to the ceiling of the vehicle for lighting the cabin of the vehicle.

The present invention is made in order to solve the above-mentioned problem, and it is therefore an object of the present invention to provide a vehicle cabin lighting apparatus which can light the whole of a vehicle cabin and can emit light having an arbitrary amount falling within a variable range and an arbitrary tone so as to provide lighting representation which is in agreement with passengers' feelings or the atmosphere of the cabin for the passengers, and which can also change the light pattern, light color, or the like according to the status of the vehicle so that the vehicle cabin lighting apparatus can serve as an alarm and safety apparatus which notifies the status of the vehicle to the passengers in the cabin and persons outside the cabin.

DISCLOSURE OF THE INVENTION

A vehicle cabin lighting apparatus in accordance with the present invention includes a monitor mounted to a ceiling of a vehicle cabin, a monitor folding-or-unfolding detecting means for detecting whether the monitor is placed in a folded or unfolded state, and a monitor control means for determining whether the monitor is placed in a video display mode or lighting mode based on a detection output of the monitor folding-or-unfolding detecting means, for controlling the operation of the monitor according to a result of the determination, and for applying, as illumination light, light emitted out of the monitor to the vehicle cabin when the monitor is placed in the lighting mode.

Therefore, in accordance with the present invention, the monitor system can be substantially used as the vehicle cabin lighting apparatus which can change the light color, amount of the light, or the like in various ways. In addition, the vehicle cabin lighting apparatus in accordance with the present invention can emit light having an arbitrary amount of light which falls within a variable range and an arbitrary tone to light the vehicle cabin from the viewpoint of functions so that passengers (users) can enjoy lighting representation which is in agreement with their feelings or the atmosphere of the cabin.

BRIEF DESCRIPTION OF THE FIGURES

FIG. 4 is a cross sectional view showing the structure of the vehicle cabin lighting apparatus in accordance with embodiment 1 of the present invention;

FIG. 5 is an exploded perspective view of the vehicle cabin lighting apparatus in accordance with embodiment 1 of the present invention;

FIG. 15 is a diagram showing examples of an alarm screen display generated by the vehicle cabin lighting apparatus in accordance with embodiment 6 of the present invention;

FIG. 16 is a flow chart for explaining the operation of the vehicle cabin lighting apparatus in accordance with embodiment 6 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
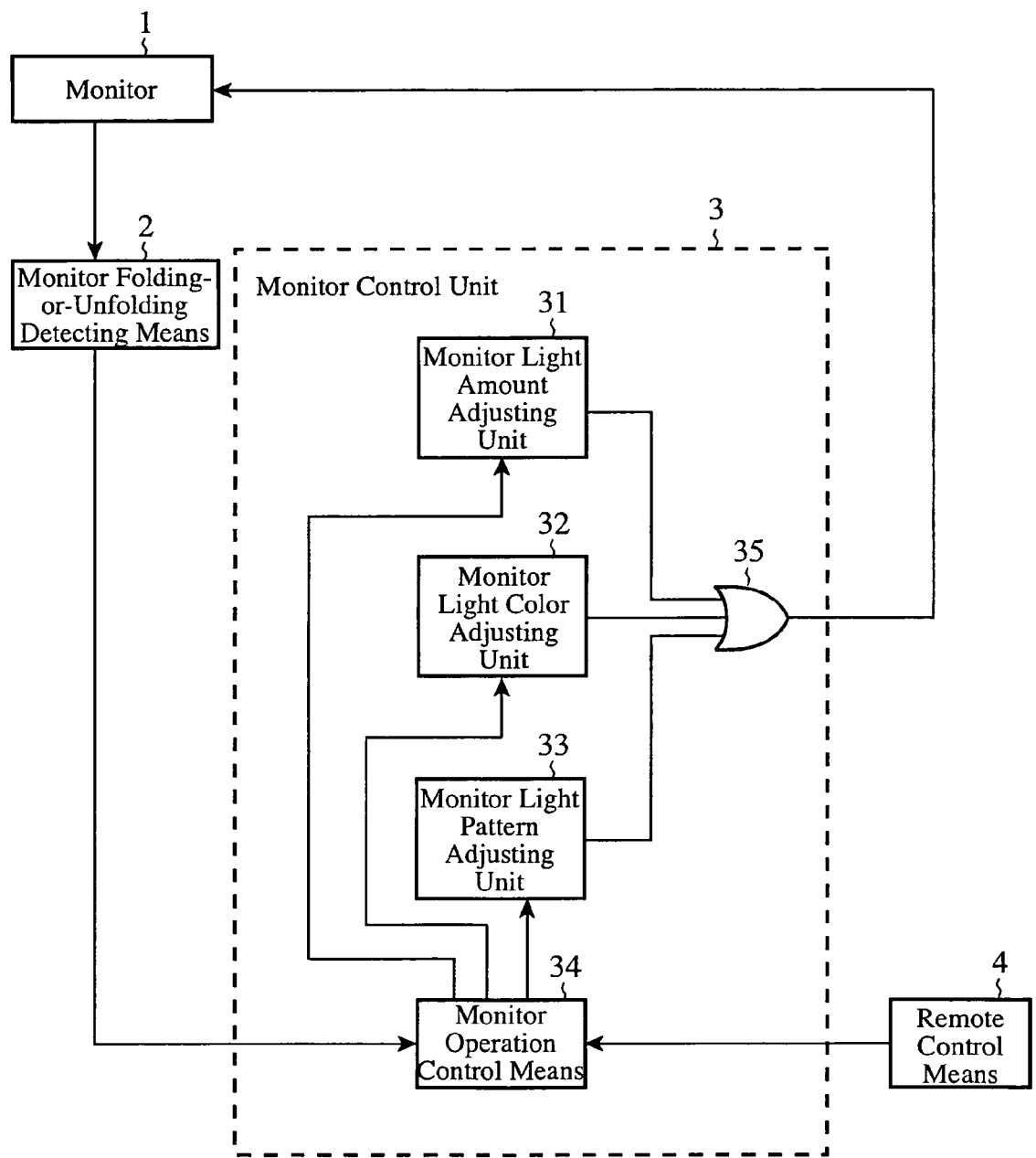
FIG. 1 is a block diagram showing the circuit structure of a vehicle cabin lighting apparatus in accordance with embodiment 1 of the present invention.

FIG. 1 is a block diagram showing the circuit structure of a vehicle cabin lighting apparatus in accordance with embodiment 1 of the present invention.

As shown in FIG. 1, the vehicle cabin lighting apparatus in accordance with this embodiment includes a monitor 1 mounted to the ceiling of a vehicle cabin, a monitor folding-or-unfolding detecting means 2 for detecting whether this monitor 1 is placed in a folded or unfolded state (i.e., whether the monitor 1 is in use or in disuse), a monitor control unit 3, which is disposed as a monitor control means, for determining whether the monitor 1 is placed in a video display mode in which it displays a TV image, image read from a DVD, or the like, or in a lighting mode in which it functions as a lighting fixture to display a white image, based on the detection result output from the monitor folding-or-unfolding detecting means 2, for controlling the operation of the monitor 1 based on the determination result, and for applying, as illumination light, the light emitted out of the monitor 1 to the cabin of the vehicle when the monitor is placed in the lighting mode, and a remote control means 4 for controlling the operation of this monitor control unit 3 according to an instruction input from outside so as to arbitrarily change the display of the monitor 1.

The monitor control unit 3 operates according to whether the monitor is placed in the folded or unfolded state. For example, when the monitor 1 is unfolded, the monitor control unit 3 displays a TV image, image read from a DVD, or the like on the monitor, whereas when the monitor 1 is folded, the monitor control unit 3 automatically switches to a certain display image (having a predetermined light emitting form, such as an amount of light, a light color, and a light pattern), such as a white image, so as to function as a lighting fixture.

The monitor control unit 3 includes a monitor light amount adjusting unit 31 for adjusting the amount of the light emitted out of the monitor 1, a monitor light color adjusting unit 32 for adjusting the color of the light emitted out of the monitor 1, a monitor light pattern adjusting unit 33 for adjusting the pattern of the light emitted out of the monitor 1, a monitor operation control means 34 for controlling the display operation of the monitor 1 when the monitor 1 is placed in the folded or unfolded state according to the detection result of the monitor folding-or-unfolding detecting means 2, and an OR circuit 35, which is disposed as a display contents selecting means, for selecting display contents when the monitor 1 is placed in the folded state under control of the monitor operation control means 34, and for instructing the monitor 1 to display the selected display contents. The monitor control unit 3 selects and adjusts one of at least the amount, color, and pattern of the light emitted out of the monitor 1, and provides a corresponding instruction to the monitor 1 when the monitor 1 is placed in the lighting mode.

The remote control means 4 enables any passenger to control the operation of the monitor control unit 3 by using a nearby switch, a nearby remote controller, or the like, to arbitrarily change the display contents, and to switch on or off the monitor. Furthermore, this remote control means 4 enables any passenger to carry out an operation and a setting associated with the displayed image (a DVD image, TV image, or the like), and a detailed setting for display (lighting) for the case where the monitor is used as a lighting fixture, etc. when the monitor 1 is unfolded, and can carry out a setting (can set the light color, amount of light, or light pattern) for the lighting functions, etc. when the monitor 1 is folded, and also enables any passenger to perform an ON/OFF operation on the power supply of the monitor regardless of whether the monitor 1 is placed in the folded or unfolded state.

Figure 2:
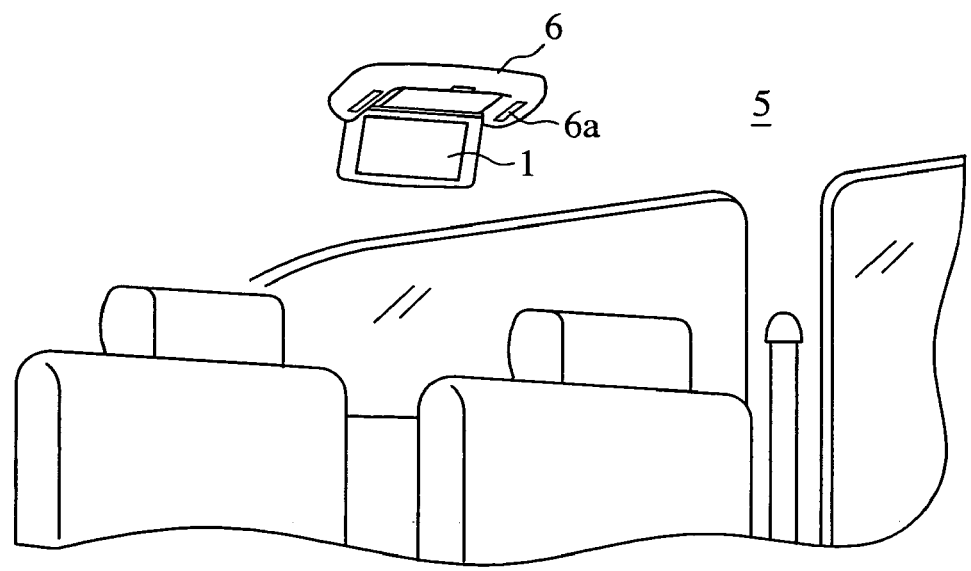
FIG. 2 is a diagram showing the state of a monitor at a time when passengers can view and listen to an image displayed on the monitor in the vehicle cabin lighting apparatus in accordance with embodiment 1 of the present invention.
Figure 3:
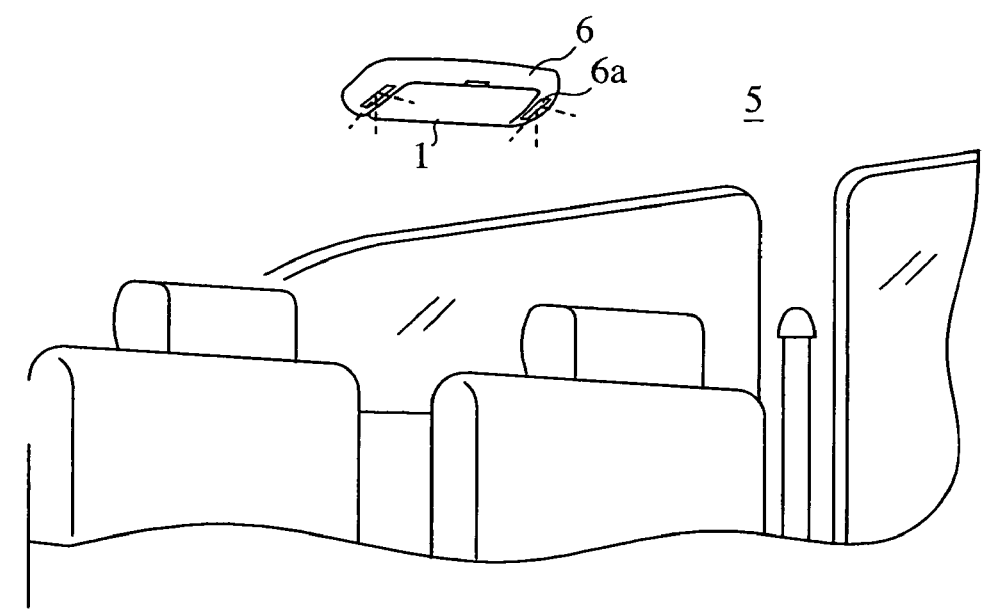
FIG. 3 is a diagram showing the state of the monitor at a time when the monitor is accommodated in the vehicle cabin lighting apparatus in accordance with embodiment 1 of the present invention.

In a case where the monitor system is arranged so as to mainly enable any passenger in the backseat of the vehicle to view and listen to a TV image, DVD image, or the like within the cabin of the vehicle, when a passenger views and listens to such an image, the monitor 1 is flipped down from the accommodating case 6 and is put into a state in which he or she can view and listen the image, as shown in FIG. 2, whereas when the monitor is in disuse, the monitor 1 is accommodated in the accommodating case 6 mounted to the ceiling of the cabin 5 of the vehicle, as shown in FIG. 3.

FIG. 4 is a cross sectional view showing the structure of the vehicle cabin lighting apparatus in accordance with embodiment 1 of the present invention, which is mounted to the vehicle's ceiling, and FIG. 5 is an exploded perspective view of FIG. 4.

As shown in FIG. 4, a prism 8 is disposed, as a light guiding member for lighting, in the accommodating case 6 mounted to the vehicle's ceiling 7, for accommodating the monitor 1 therein. This prism 8 reflects rays of light emitted out of the monitor 1, which are shown by arrows a, in rightward and leftward directions within the accommodating case 6, and guides them, as rays of illumination light shown by arrows b, to openings 6a formed in both sides of the accommodating case 6.

The concrete structure of the vehicle cabin lighting apparatus in accordance with this embodiment is shown in FIG. 5, and the monitor 1 is constructed of a cover 1a shown in FIG. 5(c), a liquid crystal assembly 1b, a diffusion sheet 1c, and a back light assembly 1d, shown in FIG. 5(d), and a case 1e shown in FIG. 5(e). As shown in the FIG. 5(b), the openings 6a for lighting are formed in the both sides of the accommodating case 6 for accommodating the monitor 1 therein, and the prism 8 formed as shown in FIG. 5(a) is mounted in the accommodating case 6 so as to receive and reflect the light emitted out of the monitor and to guide it to the openings 6a.

As shown in FIG. 4, the prism 8 is so constructed as to be partially exposed to outside from the openings 6a formed in the both sides of the accommodating case 6 and to emit out the light emitted from the monitor to outside. As an alternative, the whole or part of the accommodating case 6 can be made of such a material as a transparent or translucent resin or glass so that the light can pass through the whole or part of the accommodating case 6, and the prism can be so constructed as to guide the light emitted from the monitor to the whole or part of the accommodating case 6. In this case, the openings 6a formed in the both sides of the accommodating case 6 are stopped up so that the prism 8 is not exposed to outside.

Figure 6:
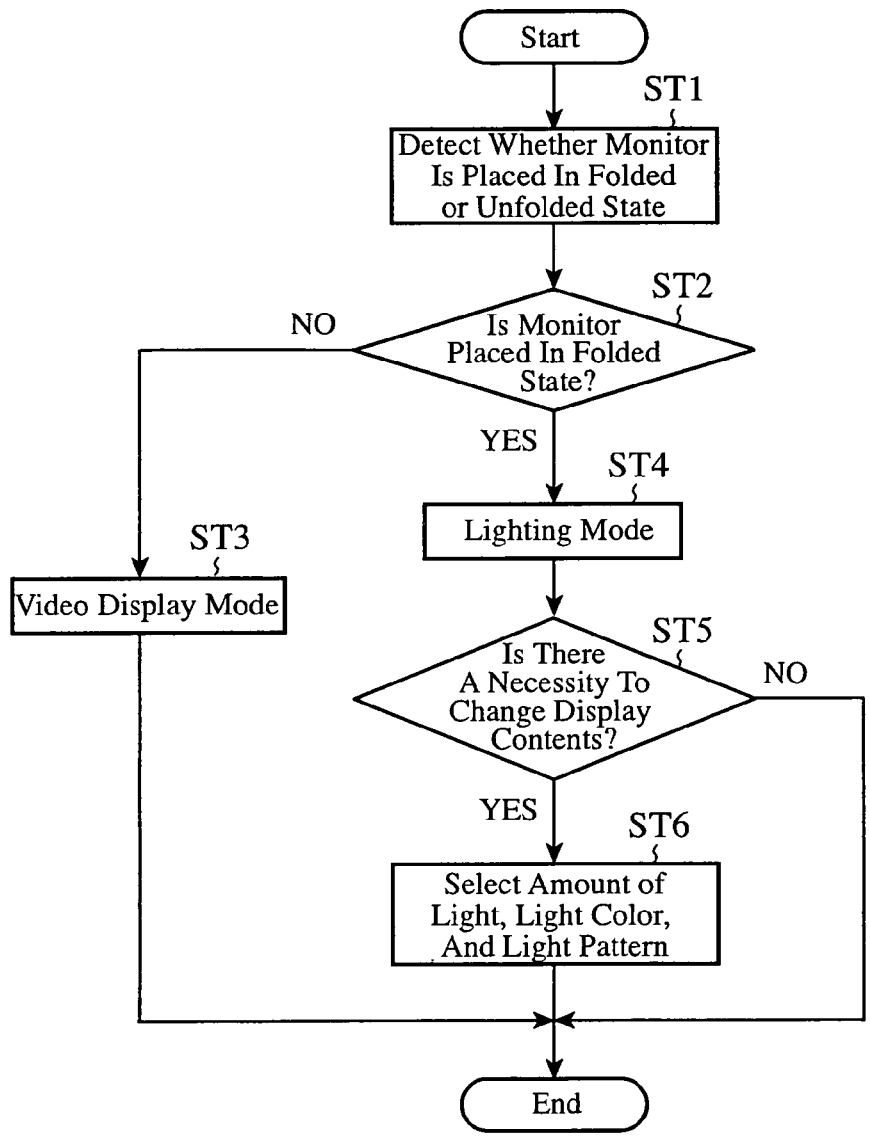
FIG. 6 is a flow chart for explaining the operation of the vehicle cabin lighting apparatus in accordance with embodiment 1 of the present invention.

Next, the operation of the vehicle cabin lighting apparatus in accordance with this embodiment of the present invention will be explained with reference to FIG. 6.

First, the monitor folding-or-unfolding detecting means 2 detects the folded or unfolded state of the monitor 1 (in step ST1). Then, the monitor operation control means 34 determines whether the monitor 1 is placed in the folded or unfolded state (in step ST2), and, when determining that the monitor 1 is not placed in the folded state, that is, when the monitor is placed in the video display mode which is the unfolded state, flips down the monitor 1 so as to display a normal TV image or DVD image on the monitor 1, and ends the processing (in step ST3).

When, in step ST2, determining that the monitor 1 is placed in the folded state, the monitor operation control means enters the lighting mode (in step ST4), and determines whether there is a necessity to change the display contents, i.e., the amount of the light, light color, light pattern, or the like of the monitor 1 (in step ST5). When needed, the monitor operation control means selects a corresponding adjusting unit, e.g., the monitor light amount adjusting unit 31 so as to adjust the amount of the light emitted out of the monitor in the case of the amount of light, selects the monitor light color adjusting unit 32 so as to adjust the color of the light emitted out of the monitor in the case of the light color, or selects the monitor light pattern adjusting unit 33 so as to adjust the pattern of the light emitted out of the monitor in the case of the light pattern. After that, the OR circuit 35 selects the needed display contents (in step ST6), and the prism 8 (see FIG. 4) disposed within the accommodating case 6 of the monitor 1 placed in the folded state reflects the light emitted out of the monitor 1 with the reflecting surface thereof so as to guide it, as illumination light, to the openings 6a. The vehicle cabin lighting apparatus thus carries out and ends the series of processes. On the other hand, when there is no necessity to change the display contents in step ST5, the monitor operation control means keeps the previously-established setting so that the prism guides the light emitted out of the monitor to the openings 6a, and ends the processing.

As previously mentioned, when the monitor 1 is accommodated in the accommodating case 6, the vehicle cabin lighting apparatus in accordance with embodiment 1 can make the monitor 1 emit light, reflect the light toward the openings 6a of the accommodating case 6 using the prism 8, and emit out the light emitted from the monitor, as illumination light, by way of these openings 6a. That is, the vehicle cabin lighting apparatus can guide the light emitted out of the monitor 1 which is a liquid crystal having a so-called back light, to the side portions of the accommodating case by using the prism 8 so as to project the light to outside the apparatus. Furthermore, the vehicle cabin lighting apparatus continuously uses the light emitted out of this monitor 1 as a light source, and controls the amount of the light (lightness), light color, light pattern, or the like by using the monitor control unit 3. Therefore, the monitor system can be substantially used as the vehicle cabin lighting apparatus which can change the light color, amount of the light, or the like in various ways.

In addition, since the vehicle cabin lighting apparatus uses the light emitted out of the monitor of the monitor system for lighting the cabin of the vehicle, the vehicle cabin lighting apparatus can emit the light with an arbitrary amount of light which falls within a variable range and an arbitrary tone to light the vehicle cabin from the viewpoint of functions so that passengers (users) can enjoy lighting representation which is in agreement with their feelings or the atmosphere of the cabin.

Embodiment 2

Figure 7:
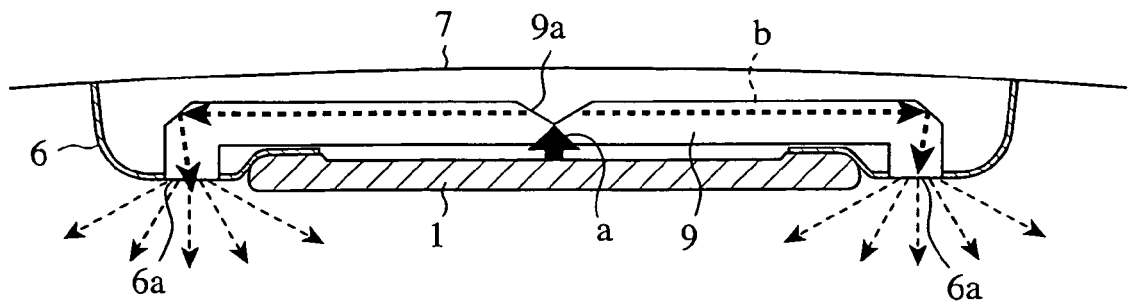
FIG. 7 is a cross sectional view showing the structure of a vehicle cabin lighting apparatus in accordance with embodiment 2 of the present invention.
Figure 8:
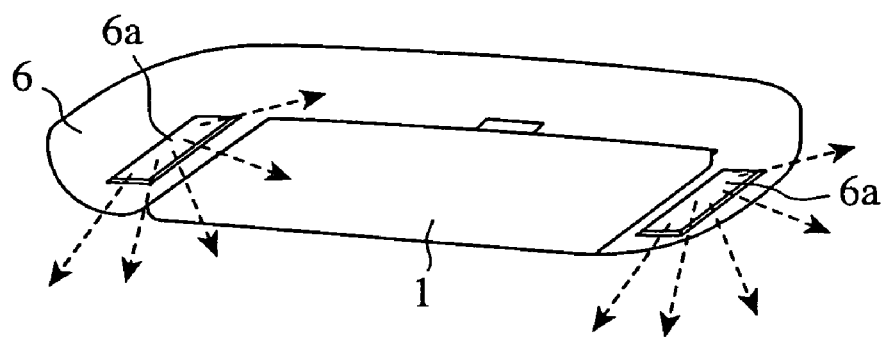
FIG. 8 is a perspective view showing a state in which monitor light is emitted from the vehicle cabin lighting apparatus in accordance with embodiment 2 of the present invention.

FIG. 7 is a cross sectional view showing the structure of a vehicle cabin lighting apparatus in accordance with embodiment 2 of the present invention, which is mounted to a vehicle's ceiling, and FIG. 8 is a perspective view showing a state in which monitor light is emitted from the vehicle cabin lighting apparatus. In FIGS. 7 and 8, components corresponding to those shown in FIGS. 4 and 5 are designated by the same reference numerals as shown in these figures, and the detailed explanation of the components will be omitted hereafter.

In FIG. 7, openings 6a for lighting are formed in both sides of an accommodating case 6 mounted to the vehicle's ceiling 7, for accommodating a monitor 1 therein, and an optical fiber 9 is attached into the accommodating case 6 as a light guiding member which is formed so as to reflect light emitted out of the monitor 1, which is shown by an arrow a, in rightward and leftward directions, and to guide them, as rays of illumination light shown by arrows b, to the openings 6a.

Since the vehicle cabin lighting apparatus is so constructed, the light emitted out of the monitor 1 placed in the folded state emits out from the openings 6a for lighting formed in the both sides of the accommodating case 6, and is then applied, as illumination light, to the cabin of the vehicle, as shown in FIG. 8.

Also in this embodiment, as shown in FIG. 7, the optical fiber 9 is so constructed as to be partially exposed to outside from the openings 6a formed in both the right and left sides of the accommodating case 6 and to emit out the light from the monitor. As an alternative, the whole or part of the accommodating case 6 can be made of such a material as a transparent or translucent resin or glass so that the light can pass through the whole or part of the accommodating case 6, and the optical fiber can be so constructed as to guide the light from the monitor to the whole or part of the accommodating case 6. In this case, the openings 6a formed in both the right and left sides of the accommodating case 6 are stopped up so that the optical fiber 9 is not exposed to outside.

Thus, in accordance with embodiment 2, since the vehicle cabin lighting apparatus uses the optical fiber 9 as the light guiding member for guiding the light emitted out of the monitor 1 to the openings 6a of the accommodating case 6 when the monitor 1 is accommodated in the accommodating case 6, the vehicle cabin lighting apparatus can have substantially the same functions as that of above-mentioned embodiment 1, and can provide the same advantages.

Embodiment 3

Figure 9:
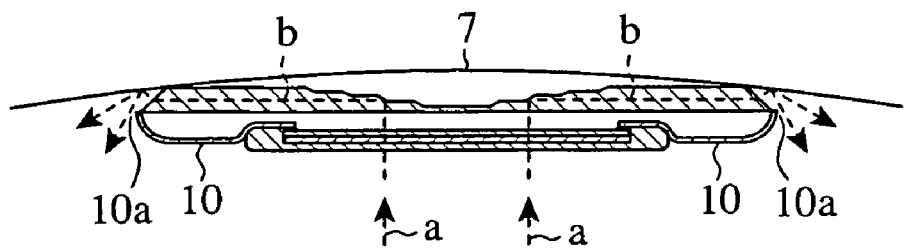
FIG. 9 is a cross sectional view showing the structure of a vehicle cabin lighting apparatus in accordance with embodiment 3 of the present invention.
Figure 10:
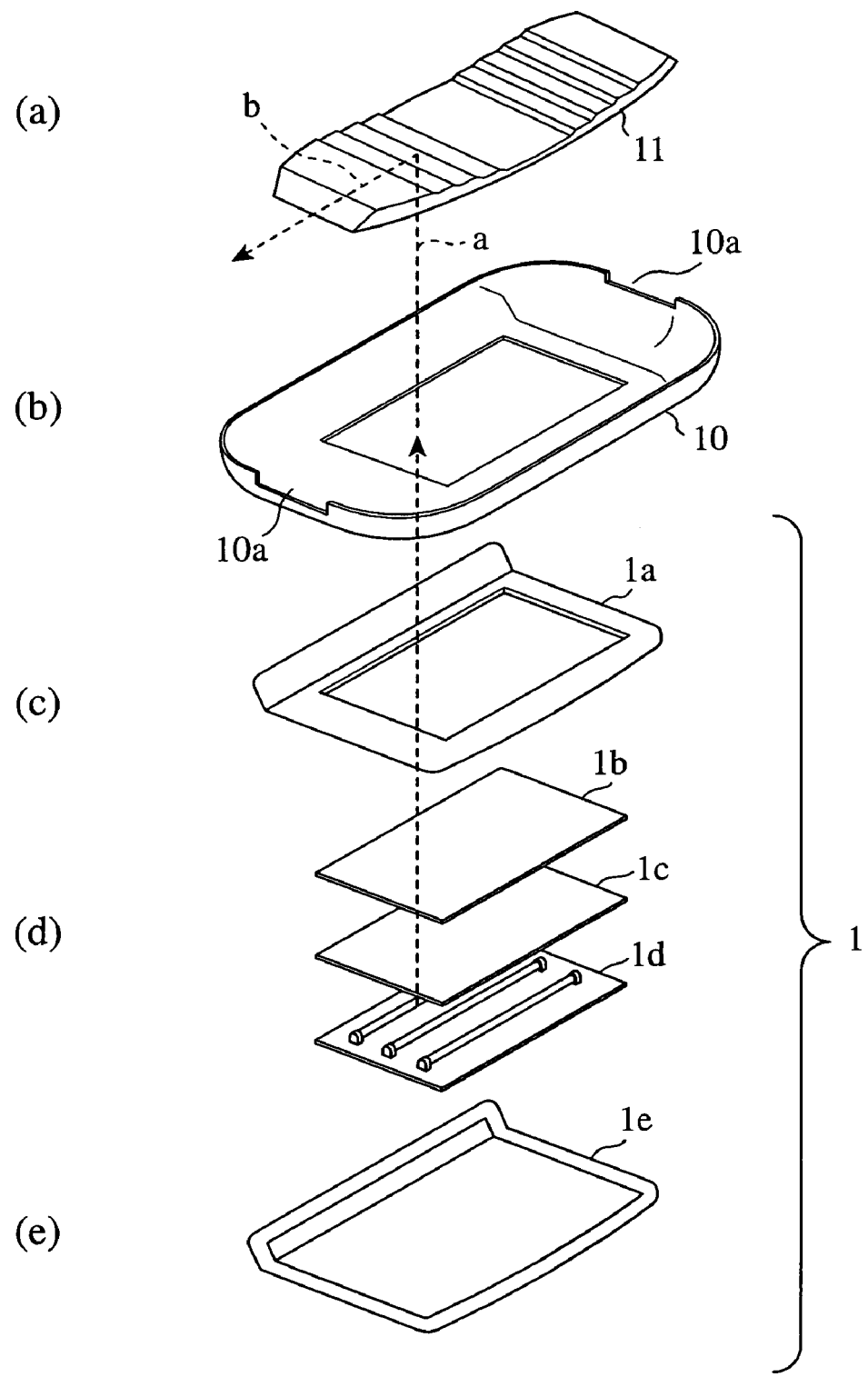
FIG. 10 is an exploded perspective view of the vehicle cabin lighting apparatus in accordance with embodiment 3 of the present invention.

FIG. 9 is a cross sectional view showing the structure of a vehicle cabin lighting apparatus in accordance with embodiment 3 of the present invention, which is mounted to a vehicle's ceiling, and FIG. 10 is an exploded perspective view of FIG. 9. In FIGS. 9 and 10, components corresponding to those shown in FIGS. 4 and 5 are designated by the same reference numerals as shown in these figures, and the detailed explanation of the components will be omitted hereafter.

The vehicle cabin lighting apparatus in accordance with any one of above-mentioned embodiments 1 and 2 functions as a direct lighting apparatus which guides light emitted out of the monitor 1 using a prism 8 or optical fiber 9, and then applies the monitor light directly to the cabin of the vehicle by way of the openings 6a formed in the both sides of the accommodating case 6. In contrast, the vehicle cabin lighting apparatus in accordance with this embodiment 3 includes openings 10a which are formed in both sides of an accommodating case 10 so that slits can be disposed between the accommodating case 10 and the vehicle's ceiling 7, and reflects light emitted out of a monitor 1 using the reflecting surface of a prism 11 which is disposed, as a light guiding member, within the accommodating case 10, in which the monitor 1 placed in the folded state is accommodated, so as to guide the light, as illumination light, to the openings 10a and to make the light travel along the direction of the vehicle's ceiling 7, as shown in FIG. 9. In this case, the vehicle cabin lighting apparatus substantially functions as an indirect lighting apparatus which emits soft light having a feeling of depth because of an indirect-lighting effect of making the light emitted out the openings along the direction of the vehicle's ceiling 7 be reflected irregularly by the vehicle's ceiling 7.

The concrete structure of the vehicle cabin lighting apparatus in accordance with this embodiment is shown in FIG. 10, and the monitor 1 is constructed of a cover 1a shown in FIG. 10(c), a liquid crystal assembly 1b, a diffusion sheet 1c, and a back light assembly 1d, shown in FIG. 10(d), and a case 1e shown in FIG. 10(e). As shown in FIG. 10(b), the openings 10a are formed in the both sides of the accommodating case 10 so that slits can be disposed between the accommodating case 10 and the vehicle's ceiling 7, and the prism 11 formed as shown in FIG. 10(a) is disposed within the accommodating case 10 so as to receive the light emitted out of the monitor and to reflect and guide it to the openings 10a such that the light travels along the direction of the vehicle's ceiling 7.

As previously mentioned, the vehicle cabin lighting apparatus in accordance with embodiment 3 is so constructed as to reflect the light emitted out of the monitor using the prism 11 toward the openings 10a which are formed in the both sides of the accommodating case 10 so that slits can be disposed between the accommodating case 10 and the vehicle's ceiling 7, and to make the light travel along the direction of the vehicle's ceiling 7. Therefore, in accordance with this embodiment, there can be provided an indirect lighting apparatus which emits out soft light having a feeling of depth because of an indirect-lighting effect of making the light emitted out the openings along the direction of the vehicle's ceiling be reflected irregularly by the vehicle's ceiling.

Embodiment 4

Figure 11:
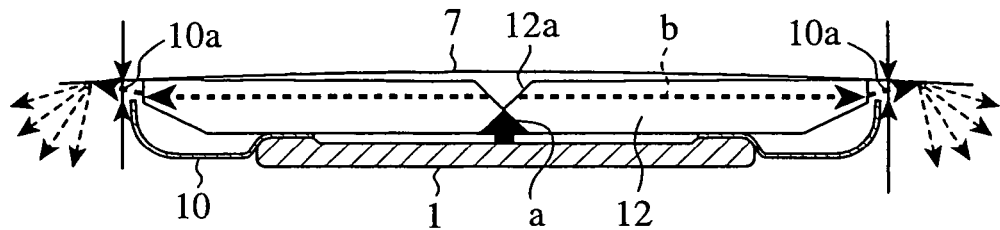
FIG. 11 is a cross sectional view showing the structure of a vehicle cabin lighting apparatus in accordance with embodiment 4 of the present invention.
Figure 12:
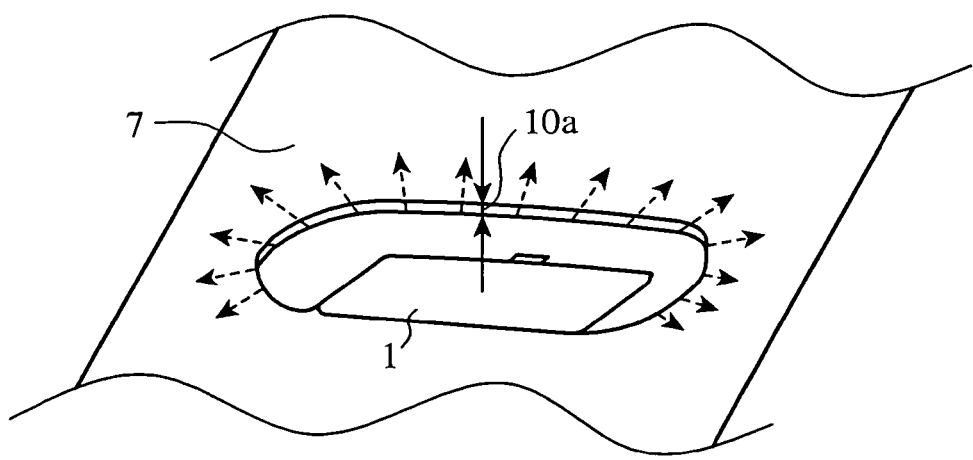
FIG. 12 is a perspective view showing a state in which monitor light is emitted from the vehicle cabin lighting apparatus in accordance with embodiment 4 of the present invention.

FIG. 11 is a cross sectional view showing the structure of a vehicle cabin lighting apparatus in accordance with embodiment 4 of the present invention, which is mounted to a vehicle's ceiling, and FIG. 12 is a perspective view showing a state in which light is emitted from the vehicle cabin lighting apparatus. In FIGS. 11 and 12, components corresponding to those shown in FIGS. 9 and 10 are designated by the same reference numerals as shown in these figures, and the detailed explanation of the components will be omitted hereafter.

In FIG. 11, the vehicle cabin lighting apparatus in accordance with this embodiment 4 includes openings 10a which are formed in the both sides of an accommodating case 10 mounted to the vehicle's ceiling 7, for accommodating a monitor 1 therein so that slits can be disposed between the accommodating case 10 and the vehicle's ceiling 7, and an optical fiber 12 is attached into the accommodating case 10 as a light guiding member which is formed so as to reflect the light emitted out of the monitor 1, which is shown by an arrow a, in rightward and leftward directions, and to guide it, as illumination light shown by arrows b, to the openings 10a.

Since the vehicle cabin lighting apparatus is so constructed, the light emitted out of the monitor 1 placed in the folded state emits out from the openings 10a for lighting formed in the both sides of the accommodating case 10, and is then applied, as illumination light, to the cabin of the vehicle, as shown in FIG. 12.

Thus, in accordance with embodiment 4, since the vehicle cabin lighting apparatus uses the optical fiber 12 as the light guiding member for guiding the light emitted out of the monitor 1 to the openings 10a of the accommodating case 10 when the monitor 1 is accommodated in the accommodating case 10, the vehicle cabin lighting apparatus can have substantially the same functions as that of above-mentioned embodiment 3, and can provide the same advantages.

Embodiment 5

Figure 13:
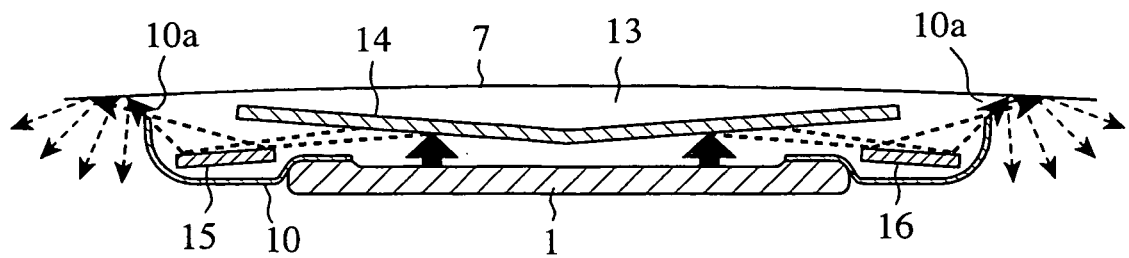
FIG. 13 is a cross sectional view showing the structure of a vehicle cabin lighting apparatus in accordance with embodiment 5 of the present invention.

FIG. 13 is a cross sectional view showing the structure of a vehicle cabin lighting apparatus in accordance with embodiment 5 of the present invention, which is mounted to a vehicle's ceiling. In FIG. 13, components corresponding to those shown in FIGS. 11 and 12 are designated by the same reference numerals as shown in these figures, and the detailed explanation of the components will be omitted hereafter.

The vehicle cabin lighting apparatus in accordance with any one of above-mentioned embodiments 1 to 4 directly receives the light emitted out of the monitor 1 using a prism, an optical fiber, or the like which is a light guiding member, and makes the light be reflected within the prism, optical fiber, or the like so as to guide it to lighting surfaces (i.e., light-emitting surfaces). In contrast, in the vehicle cabin lighting apparatus in accordance with this embodiment, a hollow 13 is formed within an accommodating case 10 and a plurality of reflectors 14 to 16 are incorporated into this hollow 13 so that light emitted out of a monitor 1 is reflected toward openings 10a formed in the accommodating case 10 using the plurality of reflectors 14 to 16 and is emitted out of the openings 10a along the direction of the vehicle's ceiling 7, as shown in FIG. 13.

That is, in accordance with this embodiment, the longest one 14 of the plurality of reflectors 14 to 16 is disposed in a central portion of the hollow 13 so as to be opposite to the monitor 1, and the shorter reflectors 15 and 16 are arranged on both sides of the reflector 14 and below the reflector 14 at a certain distance from the reflector 14. The reflector 14 is so arranged as to reflect the light emitted out of the monitor 1, and to guide it to the other reflectors 15 and 16 arranged on the both sides thereof, and the other reflectors 15 and 16 are so arranged as to reflect the light guided thereto and guide it, as illumination light, to the openings 10a formed in the both ends of the accommodating case 10, respectively, so that the light travels along the direction of the vehicle's ceiling 7.

As previously, the vehicle cabin lighting apparatus in accordance with this embodiment is so constructed as to function as an indirect lighting apparatus, like those of above-mentioned embodiment 3 and 4. As an alternative, the vehicle cabin lighting apparatus in accordance with this embodiment can be so constructed as to apply the light emitted out of the monitor directly to the cabin, like those of above-mentioned embodiments 1 and 2, even though it includes the plurality of reflectors. The vehicle cabin lighting apparatus in accordance with this embodiment can be alternatively constructed so as to guide the light emitted out of the monitor to the openings 10a using both a light guiding member, such as a prism or optical fiber, and reflectors.

Thus, in the vehicle cabin lighting apparatus in accordance with this embodiment 5, the hollow 13 is formed within the accommodating case 10 and the plurality of reflectors are incorporated into this hollow 13 so that the light emitted out of the monitor 1 is reflected toward the openings 10a using the plurality of reflectors and is emitted out of the openings 10a along the direction of the vehicle's ceiling 7. Therefore, even this embodiment provides the same advantages as offered by above-mentioned embodiments 3 and 4, and also provides an advantage of being able to simplify the structure of the vehicle cabin lighting apparatus by the omission of the light guiding member, thereby reducing the manufacturing cost.

Embodiment 6

Figure 14:
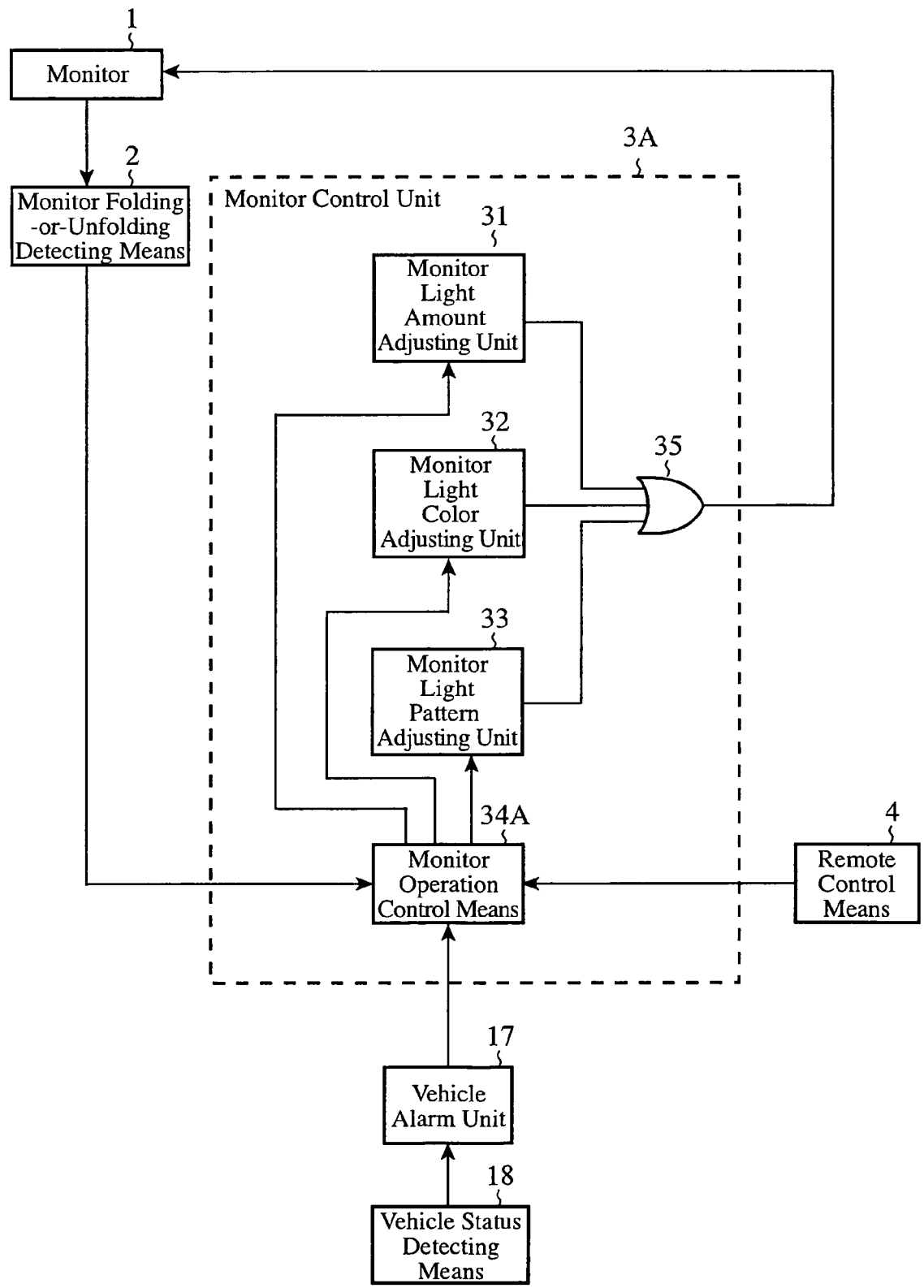
FIG. 14 is a block diagram showing the circuit structure of a vehicle cabin lighting apparatus in accordance with embodiment 6 of the present invention.

FIG. 14 is a cross sectional view showing the circuit structure of a vehicle cabin lighting apparatus in accordance with embodiment 6 of the present invention. In FIG. 14, components corresponding to those shown in FIG. 1 are designated by the same reference numerals as shown in this figure, and the detailed explanation of the components will be omitted hereafter.

The vehicle cabin lighting apparatus in accordance with this embodiment is so constructed as to operate in cooperation with the operation of an alarm apparatus or the like. For example, when a door of a vehicle in which the vehicle cabin lighting apparatus is mounted is imperfectly closed (i.e., when a door is not completely closed), when an antitheft device (e.g., an immobilizer) operates, or when a problem arises in the seat belt wearing conditions, the remaining amount of oil, the remaining amount of fuel, the remaining charged capacity of the battery, or the like, the vehicle cabin lighting apparatus emits out light in a predetermined form such as a blinking form, and serves as an alarm device which notifies passengers and persons outside the vehicle that an abnormal condition occurs in the vehicle.

As shown in FIG. 14, a monitor control unit 3A, which is disposed as a monitor control means for controlling the operation of a monitor 1, is provided with a monitor light amount adjusting unit 31, a monitor light color adjusting unit 32, a monitor light pattern adjusting unit 33, and an OR circuit 35, like the monitor control unit 3 of FIG. 1. The monitor control unit 3A further includes a monitor operation control means 34A for controlling the display operation of the monitor 1 at a time when the monitor 1 is placed in a folded or unfolded state according to a detection result of a monitor folding-or-unfolding detecting means 2, and for similarly controlling the display operation of the monitor 1 at the time when the monitor 1 is placed in the folded or unfolded state in response to an alarm signal from outside.

The vehicle cabin lighting apparatus further includes a vehicle alarm unit 17 connected to the monitor operation control means 34A, for generating an alarm signal, and a vehicle status detecting means 18 connected to the vehicle alarm unit 17, for detecting a status of the vehicle, such as whether or not all doors are completely closed, the seat belt wearing conditions, the remaining amount of oil, the remaining amount of fuel, the remaining charged capacity of the battery, or the like, or the activation of the antitheft device, as mentioned above. In response to a detection output of the vehicle status detecting means 18, the vehicle alarm unit 17 outputs an alarm signal to the monitor operation control means 34A and puts the vehicle cabin lighting apparatus into an alarm mode. In a video display mode in which the monitor 1 is placed in the unfolded state, the vehicle alarm unit 17 causes the monitor control unit 3A to display a word of warning on the screen of the monitor 1. On the other hand, in a lighting mode which the monitor 1 is placed in the folded state, the vehicle alarm unit 17 causes the monitor control unit 3A to emit out light having a predetermined pattern so as to notify passengers and persons outside the vehicle that an abnormal condition occurs in the vehicle.

The vehicle alarm unit 17 and vehicle status detecting means 18 constitute a vehicle alarm generating means. A remote control means 4 has the same functions as that of FIG. 1, and can carry out a detailed setting for display (lighting) at the time when the alarm device is activated.

FIG. 15 is a diagram showing examples of an alarm screen display generated by the monitor 1.

FIG. 15 shows display contents at the time when the monitor is placed in the folded state (i.e., the state of FIG. 3 in which the monitor 1 is accommodated in the accommodating case 6 mounted to the ceiling of the cabin 5 of the vehicle). In this case where the monitor is folded, the operation mode of the vehicle cabin lighting apparatus is substantially the lighting mode, and, when no alarm is raised, the monitor 1 lights up and the light emitted out of the monitor 1 is applied, as illumination light, to the cabin of the vehicle. When the alarm signal indicates a theft detection by the immobilizer (i.e., the antitheft device), the monitor operation control means sets the color of the illumination light emitted out of the monitor 1 to red, and then makes the monitor blink at intervals of 0.5 seconds. When the immobilizer is released, the operation control means switches off the monitor.

When the alarm signal indicates that a door is not completely closed, the monitor operation control means sets the color of the illumination light emitted out of the monitor 1 to yellow, and then makes the monitor light up. When the door is completely closed, the monitor operation control switches off the monitor. When the alarm signal indicates that a passenger forgets to wear a seat belt, the monitor operation control means sets the color of the illumination light emitted out of the monitor 1 to orange, and then makes the monitor blink at intervals of 1 second for 10 seconds, and, after that, makes it blink at intervals of 0.5 seconds and then switches off the monitor when the passenger wears the seat belt. When the alarm signal indicates a remaining oil amount warning, the monitor operation control means sets the color of the illumination light emitted out of the monitor 1 to green, and then makes the monitor blink at intervals of 2 seconds. When the vehicle alarm unit 17 is then released, the monitor operation control means switches off the monitor. When the alarm signal indicates a remaining fuel amount warning, the monitor operation control means sets the color of the illumination light emitted out of the monitor 1 to blue, and then makes the monitor blink at intervals of 2 seconds. When the vehicle alarm unit 17 is then released, the monitor operation control means switches off the monitor.

When the alarm signal indicates a remaining battery charged capacity warning, the monitor operation control means sets the color of the illumination light emitted out of the monitor 1 to white, and then makes the monitor blink at intervals of 2 seconds. When the vehicle alarm unit 17 is then released, the monitor operation control means switches off the monitor. When the alarm signal indicates that two or more alarms are simultaneously raised, the monitor operation control means causes the monitor to sequentially generate corresponding alarm display contents associated with, for example, an alarm about the above-mentioned immobilizer, .

..., and a remaining battery charged capacity warning in the order of them. The monitor operation control means switches among the two or more alarm display contents at predetermined intervals of, e.g., 10 seconds if needed, and, when one of the abnormalities is eliminated and the vehicle alarm unit 17 then cancels the issue of a corresponding alarm, switches off the generation of corresponding alarm display contents.

The light color, length of intervals at which the monitor blinks, which is defined as the light pattern, etc. which are shown in FIG. 15 for each alarm display contents are provided as an example, and are not limitedly defined for each alarm display contents.

In a case where the monitor displays certain contents in the state in which the monitor is unfolded (i.e., when the monitor 1 is flipped down from the accommodating case 6, and is placed in a state as shown in FIG. 2 in which passengers can view and listen to an image displayed on the screen of the monitor), the operation mode of the monitor is substantially the video display mode, and, when an alarm as shown in FIG. 15 is raised, for example, the following word of warning is displayed on the screen of the monitor 1 as an example, although not shown in FIG. 15.

In other words, when the alarm signal indicates that the immobilizer (i.e., the antitheft device) is activated, the following word of warning: "The antitheft device is activated" is shown. When the alarm signal indicates that a door is not completely closed, the following word of warning: "Please close the door on the side of the front seat"is shown. When the alarm signal indicates that a passenger forgets to wear a seat belt, the following word of warning: "Please wear the seat belt"is shown. When the alarm signal indicates a remaining oil amount warning, the following word of warning: "Please check the remaining oil amount"is shown. When the alarm signal indicates a remaining fuel amount warning, the following word of warning: "Please check the remaining fuel amount"is shown. When the alarm signal indicates a remaining battery charged capacity warning, the following word of warning: "Please check the remaining battery charged capacity"is shown. When the alarm signal indicates that two or more alarms are simultaneously raised, the monitor operation control means causes the monitor to sequentially generate corresponding words of warning associated with, for example, an alarm about the above-mentioned immobilizer, . . . , and a remaining battery charged capacity warning in the order of them. The monitor operation control means switches among the two or more words of warning at predetermined intervals of, for example, 5 seconds if needed, and, when one of the abnormalities is eliminated and the vehicle alarm unit 17 then cancels the issue of a corresponding alarm, switches off the display of a corresponding word of warning.

Next, the operation of the vehicle cabin lighting apparatus will be explained with reference to FIG. 16.

The vehicle alarm unit 17 detects the status of the vehicle from the detection output of the vehicle status detecting means 18 (in step ST11), and the monitor operation control means 34A determines whether an abnormal condition corresponding to an alarm as shown in FIG. 15 occurs based on this detection output (in step ST12). When no abnormal condition occurs, the monitor folding-or-unfolding detecting means 2 detects the folded or unfolded state of the monitor 1 (in step ST13). Then, the monitor operation control means 34 determines whether the monitor 1 is placed in the folded or unfolded state (in step ST14), and, when determining that the monitor 1 is not placed in the folded state, that is, when the monitor is placed in the video display mode which is the unfolded state, flips down the monitor 1 so as to display a normal TV image or DVD image on the monitor 1, and ends the processing (in step ST15).

When, in step ST14, determining that the monitor 1 is placed in the folded state, the monitor operation control means enters the lighting mode (in step ST16), and determines whether there is a necessity to change the display contents, i.e., the amount of the light, light color, light pattern, or the like of the monitor 1 (in step ST17). When needed, the monitor operation control means selects a corresponding adjusting unit, e.g., the monitor light amount adjusting unit 31 so as to adjust the amount of the light emitted out of the monitor in the case of the amount of light, selects the monitor light color adjusting unit 32 so as to adjust the color of the light emitted out of the monitor in the case of the light color, or selects the monitor light pattern adjusting unit 33 so as to adjust the pattern of the light emitted out of the monitor in the case of the light pattern. After that, the OR circuit 35 selects the needed display contents (in step ST18), and a prism 8 disposed within the accommodating case 6, as shown in FIG. 4, of the monitor 1 placed in the folded state reflects the light emitted out of the monitor 1 with the reflecting surface thereof so as to guide it, as illumination light, to openings 6a. The vehicle cabin lighting apparatus thus carries out and ends the series of processes. On the other hand, when there is no necessity to change the display contents in step ST17, the monitor operation control means keeps the previously-established setting so that the prism guides the light emitted out of the monitor to the openings 6a, and ends the processing.

On the other hand, when, in step ST12, determining that an abnormal condition occurs in the vehicle, the monitor operation control means enters the alarm mode (in step ST19) in which it identifies the status of the vehicle in which the abnormal condition occurs (in step ST20), and, when the monitor 1 is placed in the unfolded state, it advances to the video display mode of step ST15 in which it carries out a process of displaying a corresponding word of warning on the screen of the monitor 1 according to the alarm, as previously mentioned. On the other hand, when the monitor 1 is placed in the folded state, the monitor operation control means advances to the lighting mode of step ST14 in which it carries out a warning process in steps ST16 to ST18 using, for example, an above-mentioned light pattern or the like.

In other words, the monitor operation control means enters the lighting mode for warning in step ST16, and determines whether there is a necessity to change the display contents, i.e., the amount of the light, light color, light pattern, or the like of the monitor 1 (in step ST17). When needed, the monitor operation control means selects a corresponding adjusting unit, e.g., the monitor light amount adjusting unit 31 so as to adjust the amount of the light emitted out of the monitor in the case of the amount of light, selects the monitor light color adjusting unit 32 so as to adjust the color of the light emitted out of the monitor in the case of the light color, or selects the monitor light pattern adjusting unit 33 so as to adjust the pattern of the light emitted out of the monitor in the case of the light pattern. After that, the OR circuit 35 which is a display contents selecting means selects display contents according to the alarm, and the prism 8 disposed within the accommodating case 6 of the monitor 1 placed in the folded state reflects the light emitted out of the monitor 1 with the reflecting surface thereof so as to guide it, as illumination light, to the openings 6a (in step ST18). The vehicle cabin lighting apparatus thus carries out and ends the series of processes. The monitor operation control means thus carries out the series of processes for notifying passengers and persons outside the vehicle that an abnormal condition occurs in the vehicle by causing the monitor to emit out light in the light-emitting form corresponding to the alarm. On the other hand, when there is no necessity to change the display contents in step ST17, that is, when the alarm display contents are the same as the previous alarm display contents, the monitor operation control means keeps the previously-established display setting so that the prism guides, as illumination light for warning, the light emitted out of the monitor to the openings 6a, and ends the processing.

In accordance with this embodiment, the conducting member and so on of the vehicle cabin lighting apparatus mounted to the vehicle's ceiling can have the same structure as those of above-mentioned embodiments 1 to 5. Targets detected by the vehicle status detecting means 18 connected to the vehicle alarm unit 17 are not limited to those associated with the alarms as shown in FIG. 15, and other factors of the vehicle which are associated with abnormal conditions which can occur in the vehicle can be targets detected by the vehicle status detecting means. Even in this case, the same advantages are provided.

Thus, the vehicle cabin lighting apparatus in accordance with this embodiment 6 is so constructed as to operate in cooperation with the operation of the alarm unit or the like. Therefore, the present embodiment offers an advantage of making it possible for the vehicle cabin lighting apparatus to serve as an alarm and safety apparatus which notifies the occurrence of an abnormal condition to passengers and persons outside the vehicle, thereby improving the convenience of the vehicle cabin lighting apparatus, in addition to the advantages provided by above-mentioned embodiments 1 to 5.

Embodiment 7

Figure 17:
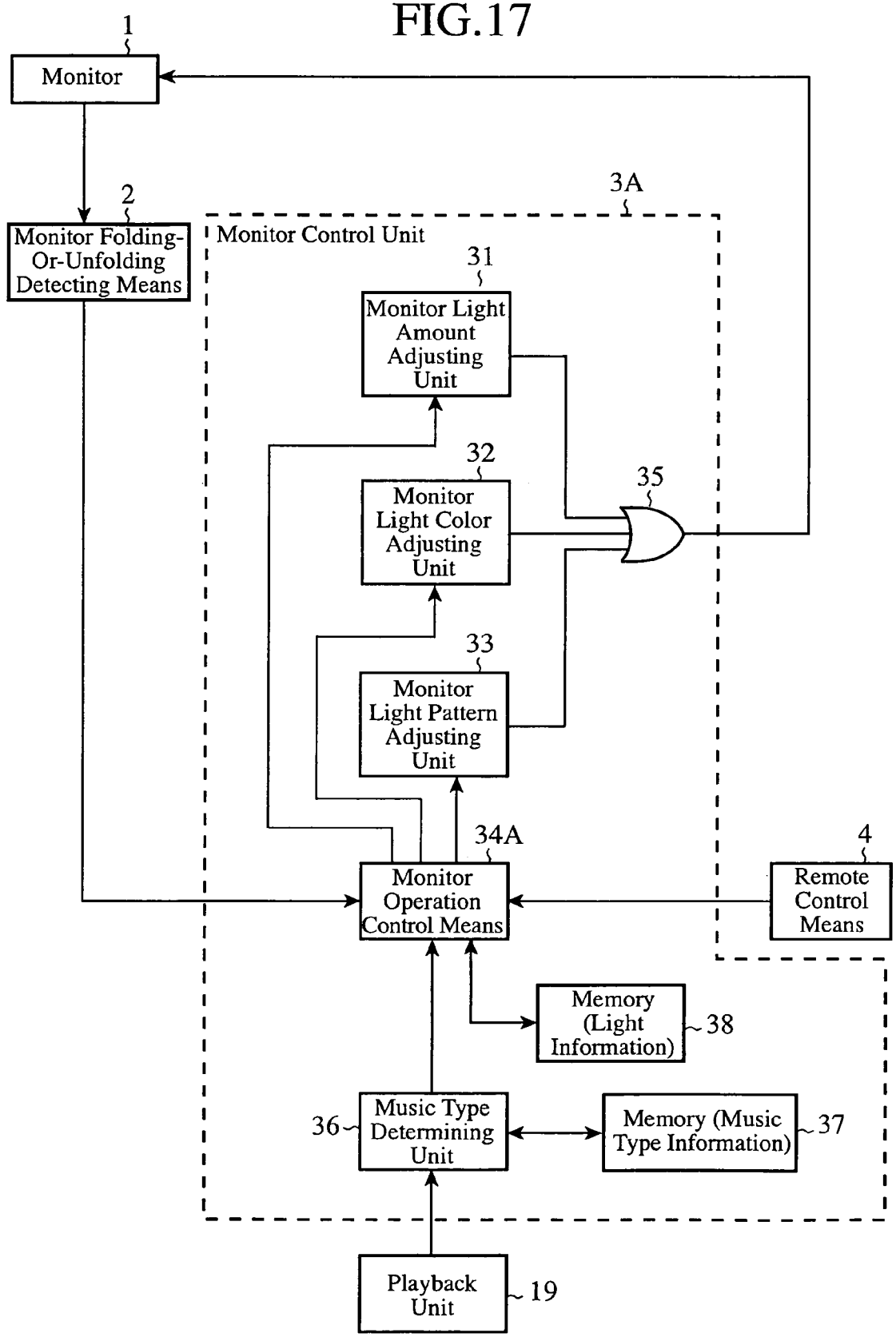
FIG. 17 is a block diagram showing the circuit structure of a vehicle cabin lighting apparatus in accordance with embodiment 7 of the present invention.

FIG. 17 is a block diagram showing circuit structure of a vehicle cabin lighting apparatus in accordance with embodiment 7 of the present invention. In FIG. 17, components corresponding to those shown in FIG. 14 are designated by the same reference numerals as shown in this figure, and the detailed explanation of the components will be omitted hereafter.

The vehicle cabin lighting apparatus in accordance with embodiment is so constructed as to operate in cooperation with the operation of a playback unit for playing back a music medium, such as a DVD or CD, so that the vehicle cabin lighting apparatus can be also used as entertainment equipment.

As shown in FIG. 17, a monitor control unit 3A, which is disposed as a monitor control means for controlling the operation of a monitor 1, is provided with a monitor light amount adjusting unit 31, a monitor light color adjusting unit 32, a monitor light pattern adjusting unit 33, and an OR circuit 35, like the monitor control unit 3A of FIG. 14, and further includes a monitor operation control means 34A for controlling a display operation at a time when the monitor 1 is placed in a folded or unfolded state according to a detection result obtained by a monitor folding-or-unfolding detection means 2, and for controlling the display operation at the time when the monitor 1 is placed in the folded or unfolded state in response to an alarm signal from outside the monitor operation control means.

The playback unit 19 plays back a recording medium, such as a CD or DVD. A music type determining unit 36 extracts music type information (e.g., classic, jazz, popular music, or the like) corresponding to music information currently being played back by the playback unit 19 from a memory 37 so as to determine the music type of the music information.

For example, when the recording medium is a CD, the memory 37 acquires information including genres (including the genre of the whole album and the genres of individual trucks), meta-genres (rock, classic, new age, jazz, etc.), and subgenres (gothic punk, ska, baroque, coral, bebop, etc.), which are pieces of additional information about the CD in advance, and prestores the information therein, by accessing, for example, the music information database (CDDB) provided by Gracenote Inc. using a communications means, such as a mobile phone.

Another memory 38 stores plural sets of information indicating a correspondence between different pieces of music type information and plural pieces of information each including an amount of monitor light, a monitor light color, and a monitor light pattern. The monitor operation control means 34A extracts information including an amount of monitor light, a monitor light color, and a monitor light pattern, and corresponding to the music type of the music information currently being played back by the playback unit based on the determination result obtained by the music type determining unit 36, and outputs the amount information of monitor light to the monitor light amount adjusting unit 31, outputs the monitor light color information to the monitor light color adjusting unit 32, and outputs the monitor light pattern information to the monitor light pattern adjusting unit 33 so that they can adjust the amount of monitor light, monitor light color, and monitor light pattern, respectively.

Thus, the vehicle cabin lighting apparatus in accordance with embodiment 7 can automatically determine the type and pattern of lighting which are suitable for the circumstances according to the music type (genre, melody, etc.) of the music information currently being played back by the playback unit 19 so as to carry out the lighting control, thereby improving the enjoyableness of the equipment.

INDUSTRIAL APPLICABILITY

As mentioned above, the vehicle cabin lighting apparatus in accordance with the present invention is suitable for utilization of image light emitted out of a monitor system in order to light a vehicle cabin in which the monitor system is disposed.

The invention claimed is:

1. A vehicle cabin lighting apparatus comprising:
   a monitor mounted to a ceiling of a vehicle cabin;
   a monitor folding-or-unfolding detector for detecting whether said monitor is placed in a folded or unfolded state;
   a monitor controller for determining whether said monitor is placed in a video display mode or lighting mode based on a detection output of said monitor folding-or-unfolding detector, for controlling an operation of said monitor according to a result of the determination, and for applying, as illumination light, light emitted out of said monitor to the vehicle cabin when said monitor is placed in the lighting mode; and
   wherein the monitor controller controls the operation of said monitor so that said monitor enters the lighting mode when said monitor is placed in the unfolded state, and so that said monitor enters the video display mode when said monitor is placed in the unfolded state, and so that said monitor enters the video display mode when said monitor is placed in the folded state.

2. The vehicle cabin lighting apparatus according to claim 1, wherein the monitor controller selects and adjusts one of at least an amount, a color, and a pattern of the light emitted out of said monitor, and provides a corresponding instruction to said monitor when said monitor is placed in the lighting mode.

3. The vehicle cabin lighting apparatus according to claim 1, comprising an accommodating case having two or more openings for lighting formed at predetermined positions thereof, for accommodating the monitor therein, and a light guiding member disposed in said accommodating case, for guiding the light emitted out of said monitor to said two or more openings to apply the light to the vehicle cabin as the illumination light.

4. The vehicle cabin lighting apparatus according to claim 1, comprising an accommodating case having two or more openings for lighting formed at both ends thereof, for accommodating the monitor therein, and a light guiding member disposed in said accommodating case, for guiding the light emitted out of said monitor to said two or more openings so tat the light is reflected by the ceiling of the vehicle to apply the light to the vehicle cabin as the illumination light.

5. The vehicle cabin lighting apparatus according to claim 1, comprising an accommodating case having two or more openings for lighting formed at both ends thereof, and a hollow formed therein, for accommodating the monitor therein, and a plurality of reflectors arranged in said hollow of said accommodating case, for guiding the light emitted out of said monitor to said two or more openings so that the light is reflected by the ceiling of the vehicle to apply the light to the vehicle cabin as the illumination light.

6. The vehicle cabin lighting apparatus according to claim 1, comprising a vehicle alarm generator connected to the monitor controller, for, when the vehicle is placed in an alarm mode in which an abnormal condition occurs in the vehicle, generating an emergency alarm corresponding to the status of the vehicle.

7. The vehicle cabin lighting apparatus according to claim 6, wherein the vehicle alarm generator includes a vehicle status detector for detecting the status of the vehicle, and a vehicle alarm unit for generating an alarm signal based on an output of said vehicle status detector, and for causing the monitor controller to generate the emergency alarm which is based on a predetermined light form according to the status of the vehicle at least when the monitor is placed in the lighting mode.

8. The light guiding member according to claim 3, wherein the light guiding member is a prism.

9. The accommodating case according to claim 3, wherein an optical fiber is attached into the accommodating case as a light guiding member which is formed so as to reflect light emitted out of the monitor.

10. The vehicle cabin lighting apparatus according to claim 3, further comprising an accommodating case for accommodating the monitor therein;
wherein the accommodating case is composed of a transparent or translucent material thereof, to emit the light to the vehicle cabin as the illumination light.

11. The vehicle cabin lighting apparatus according to claim 1, further comprising the monitor controller determines whether there is a necessity to adjust one of at least an amount, a color, and a pattern of the light emitted out of said monitor, and provides a corresponding instruction to said monitor when said monitor is placed in the lighting mode.

12. The accommodating case according to claim 3, wherein the two or more openings for lighting formed at predetermined positions thereof are disposed between the accommodating case and a ceiling of the vehicle cabin.

13. The monitor controller according to claim 2, wherein the monitor controller selects and adjusts one of at least an amount, a color, and a pattern of the light emitted out of said monitor, and provides a corresponding instruction to said monitor based on a musical genre.

14. The monitor controller according to claim 2, wherein the monitor controller selects and adjusts one of at least an amount, a color, and a pattern of the light emitted out of said monitor, and provides a corresponding instruction to said monitor based on a musical melody.

15. The vehicle cabin lighting apparatus according to claim 1, further comprises playback unit and a music type determining unit,
wherein the music type determining unit extracts music type information corresponding to music currently being played by the playback unit from a memory so as to determine the type of music information.

16. The monitor controller according to claim 15, wherein the monitor controller selects and adjusts one of at least an amount, a color, and a pattern of the light emitted out of said monitor, and provides a corresponding instruction to said monitor based on a musical genre as determined by the music type determining unit.

* * * * *